United States Patent
Asi et al.

(10) Patent No.: US 12,462,095 B2
(45) Date of Patent: Nov. 4, 2025

(54) DYNAMIC CONSTRUCTION OF LARGE LANGUAGE MODEL PROMPTS

(71) Applicant: Microsoft Technology Licensing, LLC, Redmond, WA (US)

(72) Inventors: Abed El Kader Asi, Sammamish, WA (US); Alexander Tsvetkov, Tel Aviv (IL); Royi Ronen, Tel Aviv (IL); Yarin Kuper, Tel Aviv (IL); Shahar Zvi Keren, Hemed (IL); Roy Eisenstadt, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 291 days.

(21) Appl. No.: 18/299,842

(22) Filed: Apr. 13, 2023

(65) Prior Publication Data
US 2024/0346232 A1   Oct. 17, 2024

(51) Int. Cl.
*G06F 40/166* (2020.01)
*G06F 40/40* (2020.01)

(52) U.S. Cl.
CPC ............ *G06F 40/166* (2020.01); *G06F 40/40* (2020.01)

(58) Field of Classification Search
CPC .............................. G06F 40/166; G06F 40/40
See application file for complete search history.

(56) References Cited

U.S. PATENT DOCUMENTS

| | | | |
|---|---|---|---|
| 5,948,057 A * | 9/1999 | Berger | G06Q 10/10 714/6.32 |
| 9,564,122 B2 | 2/2017 | Bretter et al. | |
| 11,516,158 B1 | 11/2022 | Luzhnica et al. | |
| 2022/0270008 A1* | 8/2022 | Milden | G06Q 10/0635 |
| 2022/0391591 A1* | 12/2022 | Ronen | G06F 16/345 |
| 2023/0027310 A1* | 1/2023 | Muralidharan | G06F 40/166 |
| 2023/0040095 A1 | 2/2023 | Shang | |
| 2023/0334263 A1* | 10/2023 | Konam | G16H 10/20 |

(Continued)

OTHER PUBLICATIONS

"Codify Intelligence with Large Language Models", Retrieved from: https://www.nvidia.com/en-in/deep-learning-ai/solutions/large-language-models/, Retrieved Date: Mar. 16, 2023, 6 Pages.

(Continued)

*Primary Examiner* — Bhavesh M Mehta
*Assistant Examiner* — Edward Tracy, Jr.
(74) *Attorney, Agent, or Firm* — Foley IP Law, PLLC

(57) ABSTRACT

Example solutions for reducing the likelihood of hallucinations by language models, such as large language models (LLMs) are disclosed. By injecting a sufficient range and quantity of curated factual data into a prompt, the likelihood of a hallucination by an LLM may be reduced. This enables language models to be used in a wider range of settings, in which fabrication of facts is problematic, while reducing the need for a human to carefully check the generated text for accuracy. Examples include: generating a summary of a transcript using a summarization model; extracting topic-specific data from stored data using a scoring model; dynamically generating a language model prompt using the topic-specific data and the summary; and generating an output text using a language model and the language model prompt.

20 Claims, 12 Drawing Sheets

(56) References Cited

U.S. PATENT DOCUMENTS

2024/0289558 A1* 8/2024 Muraoka ............... G06F 40/30

OTHER PUBLICATIONS

"Salesforce Announces Einstein GPT, the World's First Generative AI for CRM", Retrieved from: https://www.salesforce.com/news/press-releases/2023/03/07/einstein-generative-ai/, Mar. 7, 2023, 11 Pages.

Bass, Dina, "Microsoft Will Use OpenAI Tech to Write Emails for Busy Salespeople", Retrieved from: https://www.bloomberg.com/news/articles/2023-02-02/microsoft-uses-chatgpt-maker-s-ai-to-write-emails-for-busy-salespeople, Feb. 2, 2023, 6 Pages.

Betz, et al., "Thinking Aloud: Dynamic Context Generation Improves Zero-Shot Reasoning Performance of GPT-2", In Repository of arXiv:2103.13033v1, Mar. 24, 2021, 17 Pages.

Huang, et al., "API Entity and Relation Joint Extraction from Text via Dynamic Prompt-tuned Language Model", In Repository of arXiv:2301.03987v1, Jan. 10, 2023, 20 Pages.

Pandey, Nishant, "Conversational AI with Large Language Models", Retrieved from: https://www.netomi.com/conversational-ai-with-large-language-models, Feb. 10, 2023, 13 Pages.

Pereira, et al., "Visconde: Multi-document QA with GPT-3 and Neural Reranking", In Repository of arXiv:2212.09656v1, Dec. 19, 2022, 11 Pages.

Swamy, et al., "Contextual Dynamic Prompting for Response Generation in Task-oriented Dialog Systems", In Repository of arXiv:2301.13268v2, Feb. 10, 2023, 10 Pages.

Greyling, Cobus, "Preventing LLM Hallucination With Contextual Prompt Engineering—An Example From OpenAI", Retrieved from the URL: https://cobusgreyling.medium.com/preventing-llm-hallucination-with-contextual-prompt-engineering-an-example-from-openai-7e7d58736162, Jan. 10, 2023, 13 Pages.

International Search Report and Written Opinion received for PCT Application No. PCT/US2024/022904, Jun. 28, 2024, 13 pages.

* cited by examiner

DYNAMIC CONSTRUCTION OF LARGE LANGUAGE MODEL PROMPTS

BACKGROUND

A generative pre-trained transformer (GPT), such as GPT-3 and GPT-4, is a form of artificial intelligence (AI), within a set of machine learning (ML) models known as large language models (LLMs). An LLM is typically a deep learning model, comprising a neural network having a parameter count in the billions, and trained to predict the next word in a sentence. This permits LLMs, when given a context, to generate text that is similar to human-authored text. Current versions of chatGPT are based on GPT-3 or GPT-4. GPT-4 is able, for example to generate text describing an image.

However, LLMs may hallucinate. A hallucination is a confident response by an AI entity, such as a large language model, that is not justified by its training data, and may involve the fabrication of purported facts. When generating text to be consumed in a business setting, the fabrication of facts may be problematic, deterring the use of LLMs for some applications.

SUMMARY

The disclosed examples are described in detail below with reference to the accompanying drawing figures listed below. The following summary is provided to illustrate some examples disclosed herein.

Example solutions for performing dynamic construction of large language model prompts include: generating a summary of a transcript using a summarization model; extracting topic-specific data from stored data using a scoring model; dynamically generating a language model prompt using the topic-specific data and the summary; and generating an output text using a language model and the language model prompt.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Due to the risk of a large language model (LLM) fabricating facts, in some settings, such as business-to-business communications, either a human user needs to carefully check LLM-generated text for accuracy, or a solution to reduce the risk of hallucination is needed. By injecting a sufficient range and quantity of curated factual data into a prompt that is provided to a language model (e.g., an LLM), the likelihood of a hallucination by the language model is reduced.

Example solutions for reducing the likelihood of hallucinations by language models are disclosed. This enables language models to be used in a wider range of settings, in which fabrication of facts is problematic, while reducing the need for a human to carefully check the generated text for accuracy. Examples include: generating a summary of a transcript using a summarization model; extracting topic-specific data from stored data using a scoring model; dynamically generating a language model prompt using the topic-specific data and the summary; and generating an output text using a language model and the language model prompt.

Example solutions described herein advantageously improve the accuracy of computing operations, such as reducing artificial intelligence (AI) hallucinations. This is accomplished at least in part, by dynamically generating a language model prompt using topic-specific data (which is known to have sufficient accuracy) and a summary of a transcript (which provides context for output text).

Various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

Figure 1:
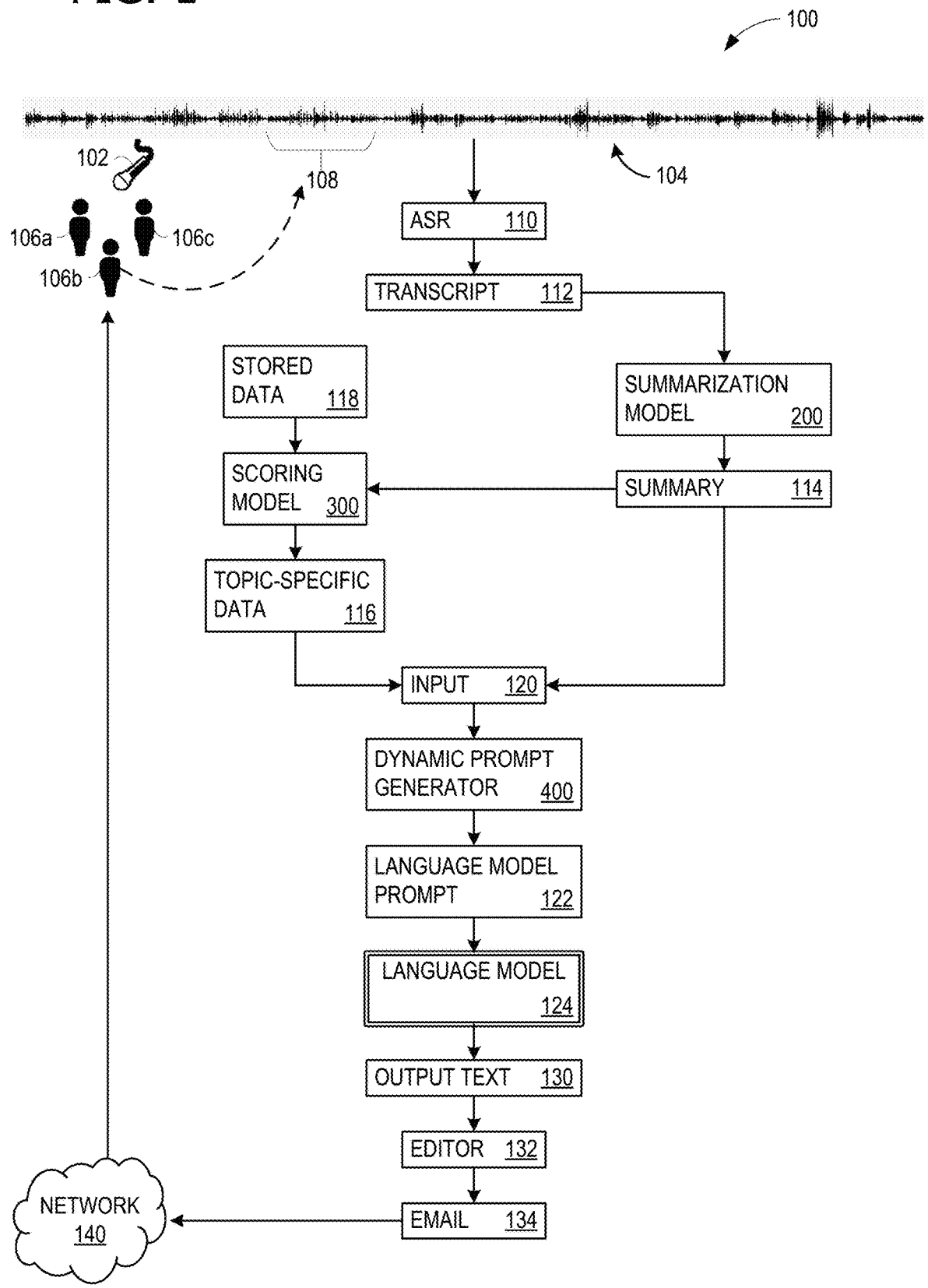
FIG. 1 illustrates an example architecture that provides for dynamic construction of large language model prompts.

FIG. 1 illustrates an example architecture 100 that provides for dynamic construction of large language model prompts. A microphone 102 captures audio data 104 from a conversation among three speakers 106a-106c. In some examples, multiple audio capturing devices are used, and the conversation may be among participants on a telephone call or a video conference, such as over a public switched telephone network (PSTN), a computer network using internet protocol (IP) voice, or another arrangement. In some examples, a different number of speakers may participate.

In one scenario, speaker 106a is a sales representative, speaker 106b is a potential customer, and architecture 100 is used to generate an email message 134 summarizing the conversation, as captured in audio data 104. For example, audio data 104 comprises a voice signal 108 from speaker 106b, and email message 134 includes a summarization of a statement by speaker 106b within voice signal 108, as well as statements by speaker 106a and, if speaker 106c is a third participant, also from speaker 106c.

Figure 2:
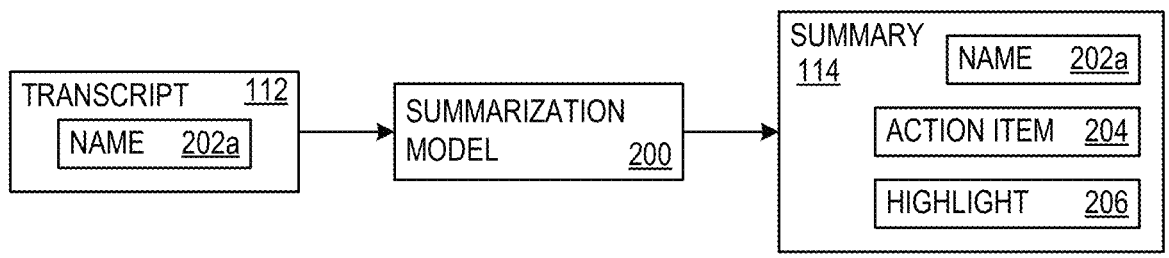
FIG. 2 illustrates an exemplary summarization model, such as may be used in the example architecture of FIG. 1.

An automatic speech recognition (ASR) module 110 generates a transcript 112 of audio data 104, which is provided to a summarization model 200. Summarization model 200 generates a summary 114 of transcript 112. In some examples, summarization model 200 comprises a machine learning (ML) model. As used herein ML, includes AI. Further detail for this stage is illustrated in FIG. 2.

Figure 3:
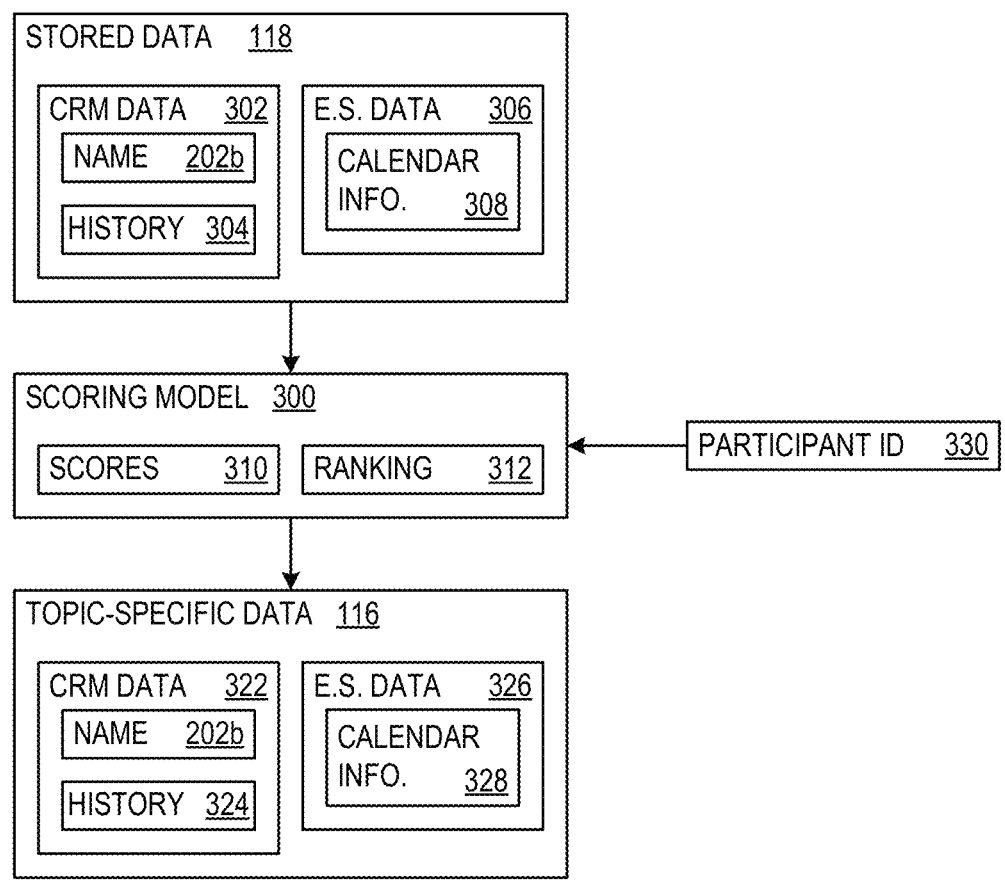
FIG. 3 illustrates an exemplary scoring model, such as may be used in the example architecture of FIG. 1.

Additionally, a second model or logic component, shown as a scoring model 300 extracts curated topic-specific data 116 from stored data 118. In some examples, scoring model 300 also comprises an ML model. In some examples, stored data 118 comprises graph data, such as customer relations management (CRM) data and enterprise suite data (e.g., calendar information and/or other data files available from an office productivity software suite). In some examples, summary 114, or extracts from summary 114, are used to identify speaker 106b and/or speaker 106c. Further detail for this stage is illustrated in FIG. 3.

Figure 4:
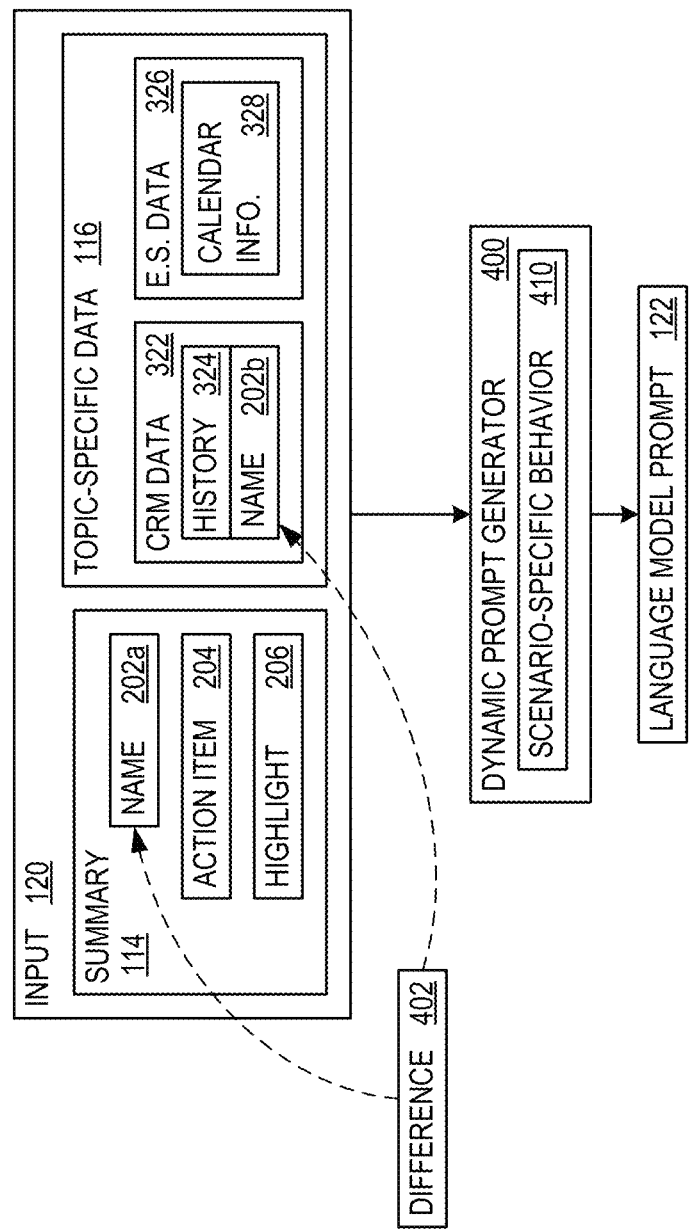
FIG. 4 illustrates an exemplary dynamic prompt generator, such as may be used in the example architecture of FIG. 1.

Summary 114 and topic-specific data 116 are combined into input 120 to a dynamic prompt generator 400 that generates a custom language model prompt 122 for a language model 124. Language model prompt 122 is customized for the scenario of the conversation, such as the number of speakers involved and the context (e.g., a stage of a sales process). Further detail for this stage is illustrated in FIG. 4.

Language model 124 may be an LLM, and in some examples comprises GPT-3, GPT-4, chatGPT, or an equivalent. Language model 124 produces an output text 130, which may be sent automatically as email message 134, or edited using an editor 132, such as by speaker 106a or another person, to refine output text 130 into email message 134. Email message 134 is then transmitted across a computer network 140 (e.g., including the internet) to a recipient, such as speaker 106b (e.g., a participant of the conversation) and/or another recipient who may benefit from receiving a summary of the conversation.

FIG. 2 illustrates further detail for summarization model 200 generating summary 114 from transcript 112. Transcript 112 contains a name 202a corresponding to speaker 106b, although in this example scenario, name 202a has a misspelling. Summarization model 200 is likely to output name 202a into summary 114 as it is received in transcript 112, without correcting it. However, as described below, the misspelling in name 202a will be corrected by dynamic prompt generator 400.

Summarization model 200 has been trained to intake large transcripts, covering conversations lasting several tens of minutes (e.g., 30 minutes or more), and produce a relevant summary. Thus, summary 114 includes at least one action item 204 and at least one summary highlight 206. Example action items and highlights are shown in FIGS. 5A-6B. Highlights are short phrases summarizing a single-topic aspect of transcript 112, which may each cover several minutes of a conversation, and action items are similar to highlights, but giving an expectation of some future activity by one or more persons.

FIG. 3 illustrates further detail for scoring model 300 extracting topic-specific data 116 from stored data 118. Stored data 118 includes CRM data 302 and enterprise suite data 306 (e.g., calendar information 308) for multiple contacts, and is thus uncurated data (i.e., not specifically relevant to summary 114). CRM data 302 includes name 202b for speaker 106b, which is more likely to have a correct spelling than name 202a. This is because CRM data 302 may be drawn from textual material provided at some point earlier by speaker 106b, or have been otherwise vetted over time, whereas name 202a in transcript 112 is a result of an ASR process. The example misspelling (shown later in FIG. 5A) is that name 202a is "Sarah", whereas name 202b is "Sara". It should be noted that this is merely an example and, in some examples, name 202a is correct while name 202b is incorrect.

CRM data 302 also includes a CRM interaction history 304 associated with speaker 106b, as represented by names 202a and 202b, among interaction histories for multiple people. Scoring model 300 receives a participant identification (ID) 330 that identifies participants in the conversation that was captured as audio data 104, and uses participant ID 330 to select relevant information within stored data 118. In some examples, this is accomplished using a mix of logic and heuristics to score information within stored data 118.

As illustrated, scoring model 300 generates scores 310 indicating relevance of information within stored data 118 to participant ID 330 and/or summary 114. In some examples, participant ID 330 is extracted from summary 114; in some examples summary 114 is provided to scoring model 300; and in some examples, criteria for scoring relevance of stored data 118 is provided in some other manner. A ranking 312 of scores 310 is used to down-select information within stored date to produce topic-specific data 116.

Topic-specific data 116 has a subset of information from stored data 118 that is most relevant to summary 114. In some examples, topic-specific data 116 includes CRM data 322 and enterprise suite data 326. CRM data 322 and enterprise suite data 326 are curated data sets, because they are relevant to summary 114 and/or the participants in the conversation, as indicated by participant ID 330. For example, CRM data 322 includes name 202b and a (CRM) interaction history 324, and enterprise suite data 326 includes calendar information 328. In this example of the conversation indicated in FIG. 1 being a sales call, interaction history 324 indicates whether name 202b is associated with a contact who is a lead in the introductory stage of a sale, a prospect in the intermediate stage of a sale, or someone who in or nearing the closing stage of a sale. Calendar information 328 is an indication of one or more potential appointments for which speaker 106b (or another intended recipient of email message 134) is available for a follow-up meeting, call, or video conference.

FIG. 4 illustrates further detail for dynamic prompt generation. Input 120 is illustrated as comprising summary 114 and topic-specific data 116. Dynamic prompt generator 400 has scenario-specific behavior 410, such as logic and heuristics, to generate custom language model prompt 122 that is specific to the scenario of the conversation depicted in FIG. 1. For example, the number of participants in the conversation (i.e., a count of speakers 106a-106c), and the CRM history of the conversation participants, as captured in interaction history 324.

If interaction history 324 indicates that the participants have had prior conversations, as opposed to the conversation being an initial introduction, scenario-specific behavior 410 will generate different prompts than what would be generated for an initial introductory conversation. This dynamic approach provides advantages over traditional approaches of using static prompts (e.g., a predetermined set of prompts that are generic to a set of conversations), because it prevents duplicate email messages 134 being sent to speaker 106b at different times—even if the conversations are similar. Prompts will differ for new sales prospects, won prospects and lost prospects. Additionally, the prompts will be accurate and relevant.

Summary has name 202a, which was produced via ASR, whereas topic-specific data 116 has name 202b, which was extracted from CRM data 302. For some names which have different spellings and similar pronunciations, this creates the possibility of a difference 402 between name 202a in summary 114 and name 202b in topic-specific data 116. In some examples, dynamic prompt generator 400 will resolve difference 402 in favor of topic-specific data 116.

Figure 5A:
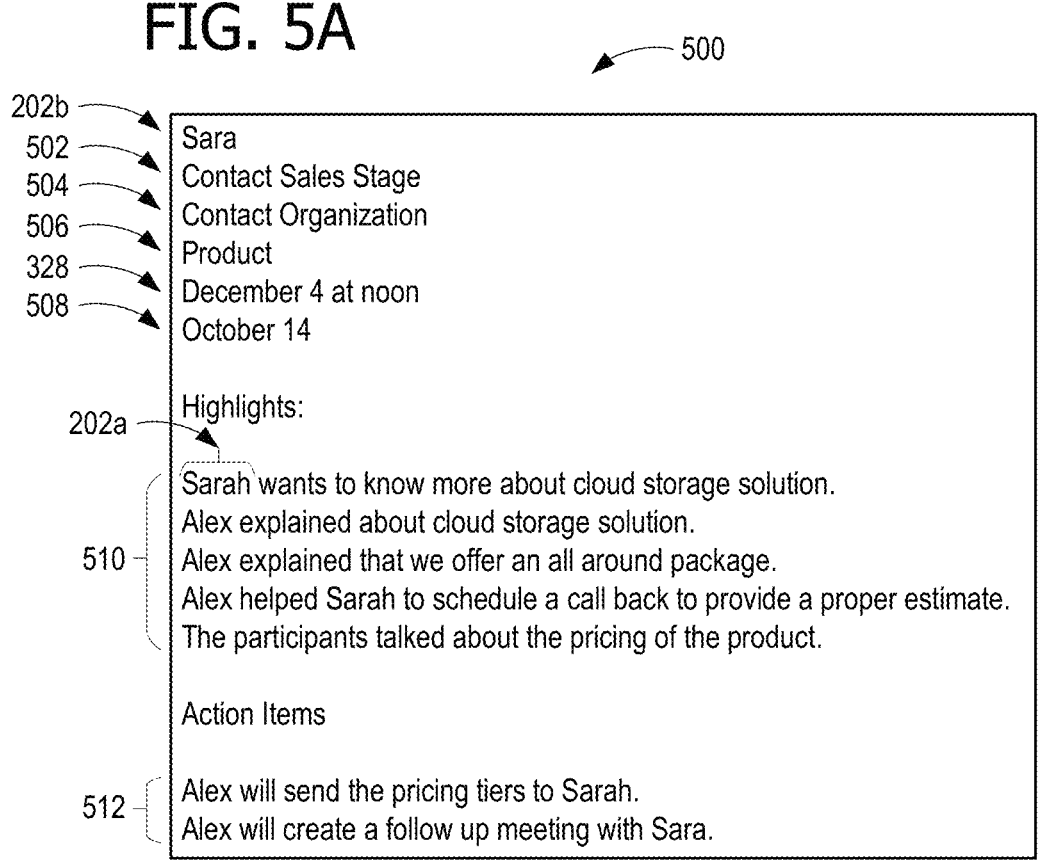
FIGS. 5A, 5B, and 5C illustrate an exemplary progression from input to the dynamic prompt generator of FIG. 4 through output text, such as may occur in the example architecture of FIG. 1.
Figure 5B:
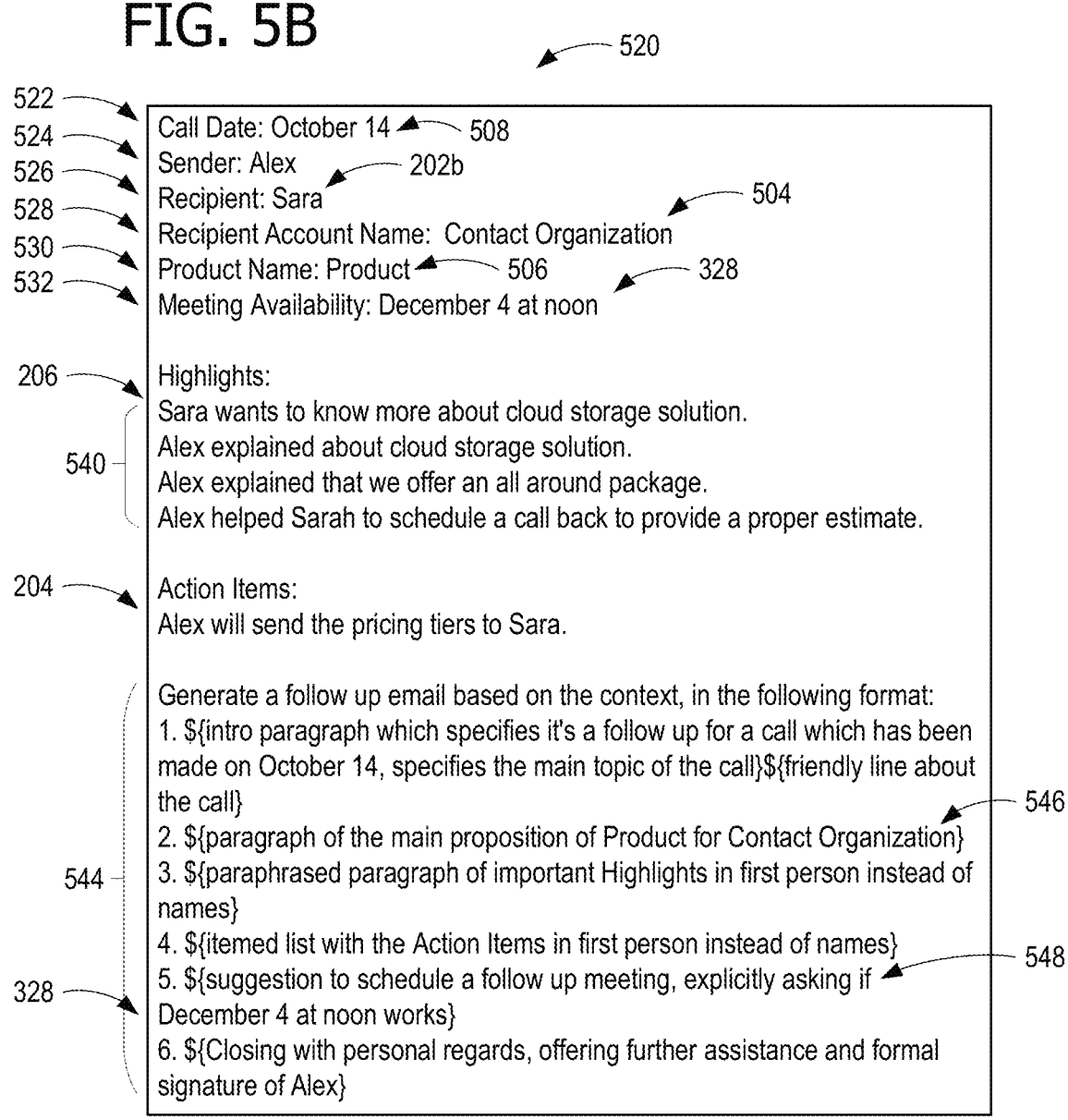
Figure 5C:
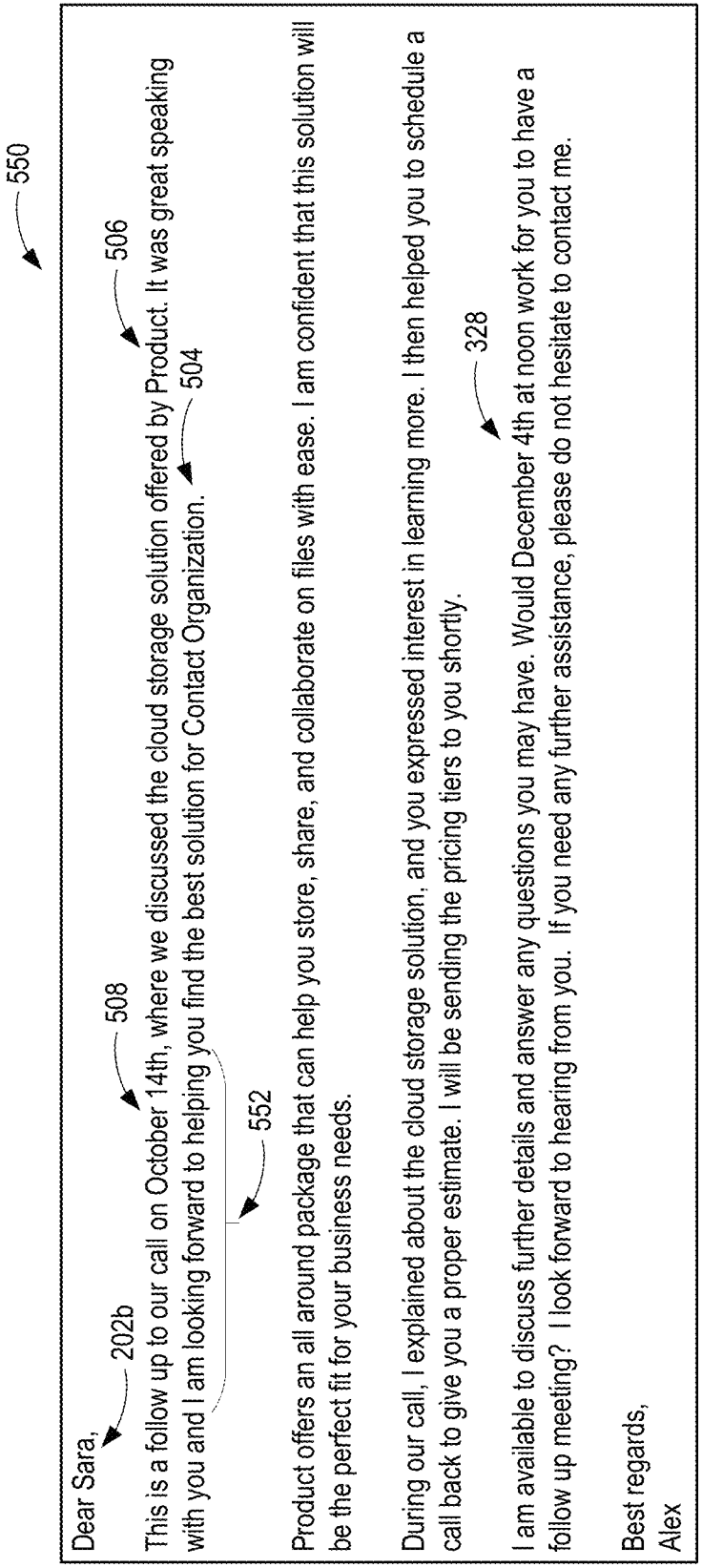
Figure 6A:
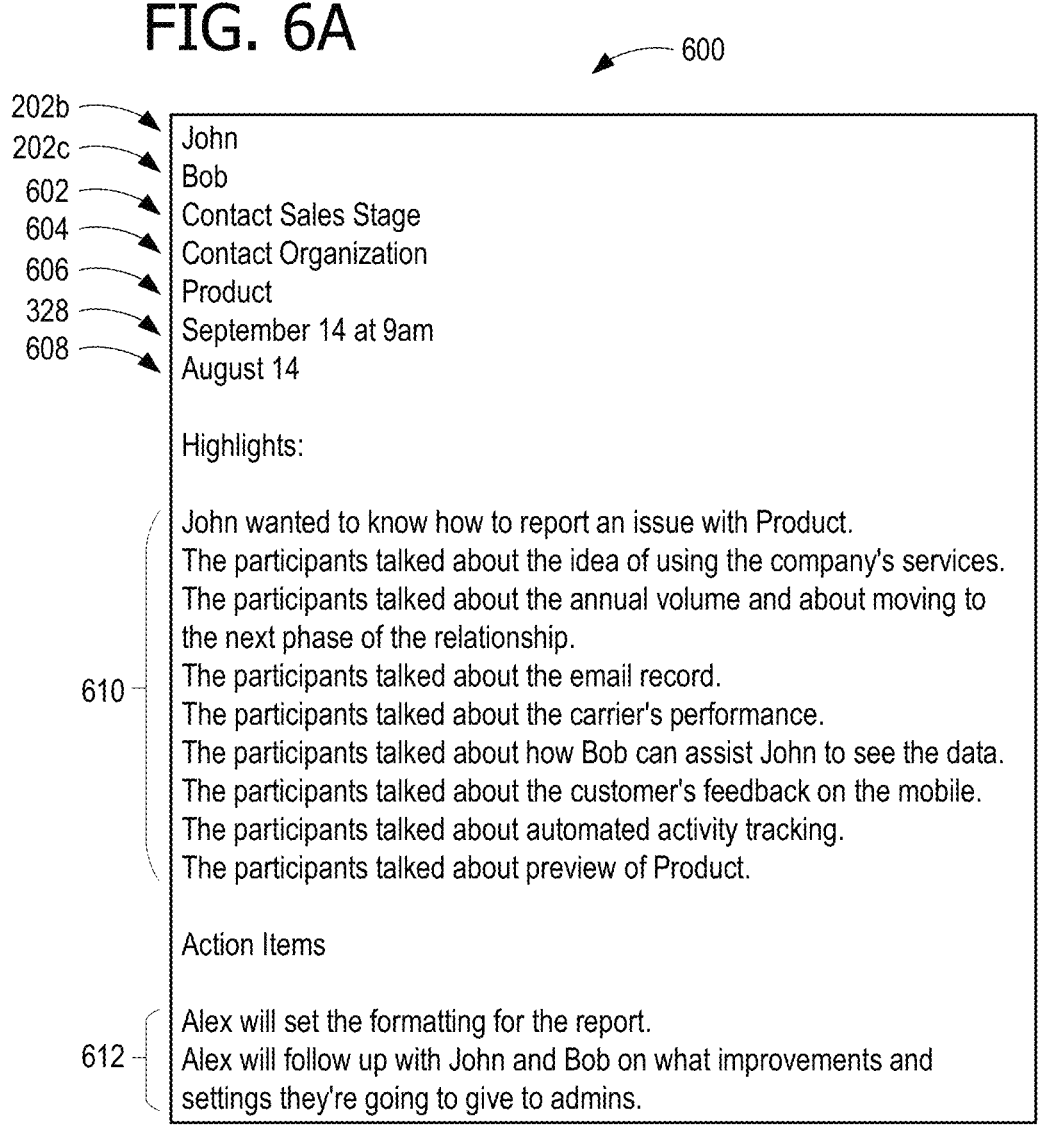
FIGS. 6A, 6B, and 6C illustrate an exemplary progression from input to the dynamic prompt generator of FIG. 4 through output text, such as may occur in the example architecture of FIG. 1.
Figure 6B:
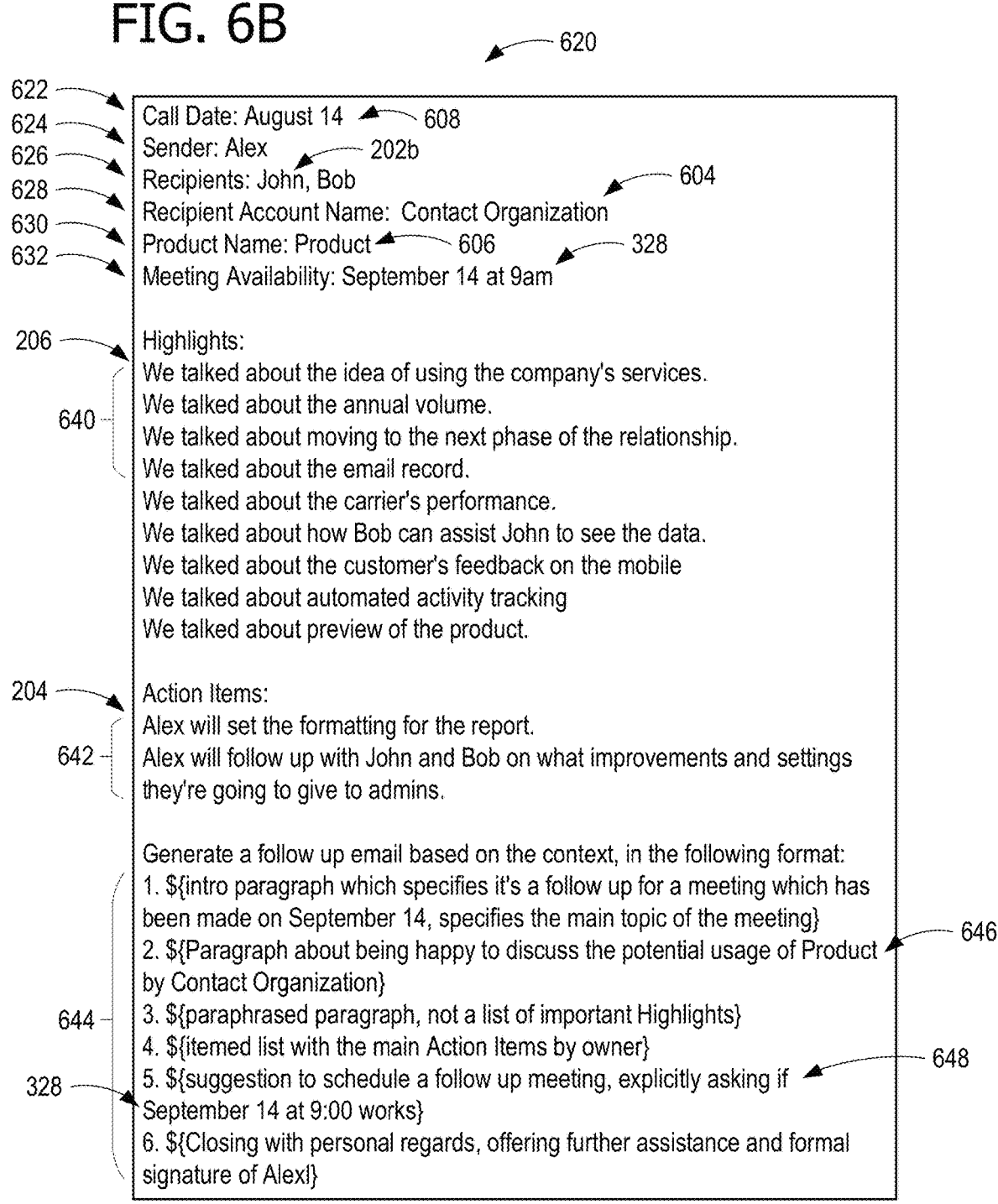
Figure 6C:
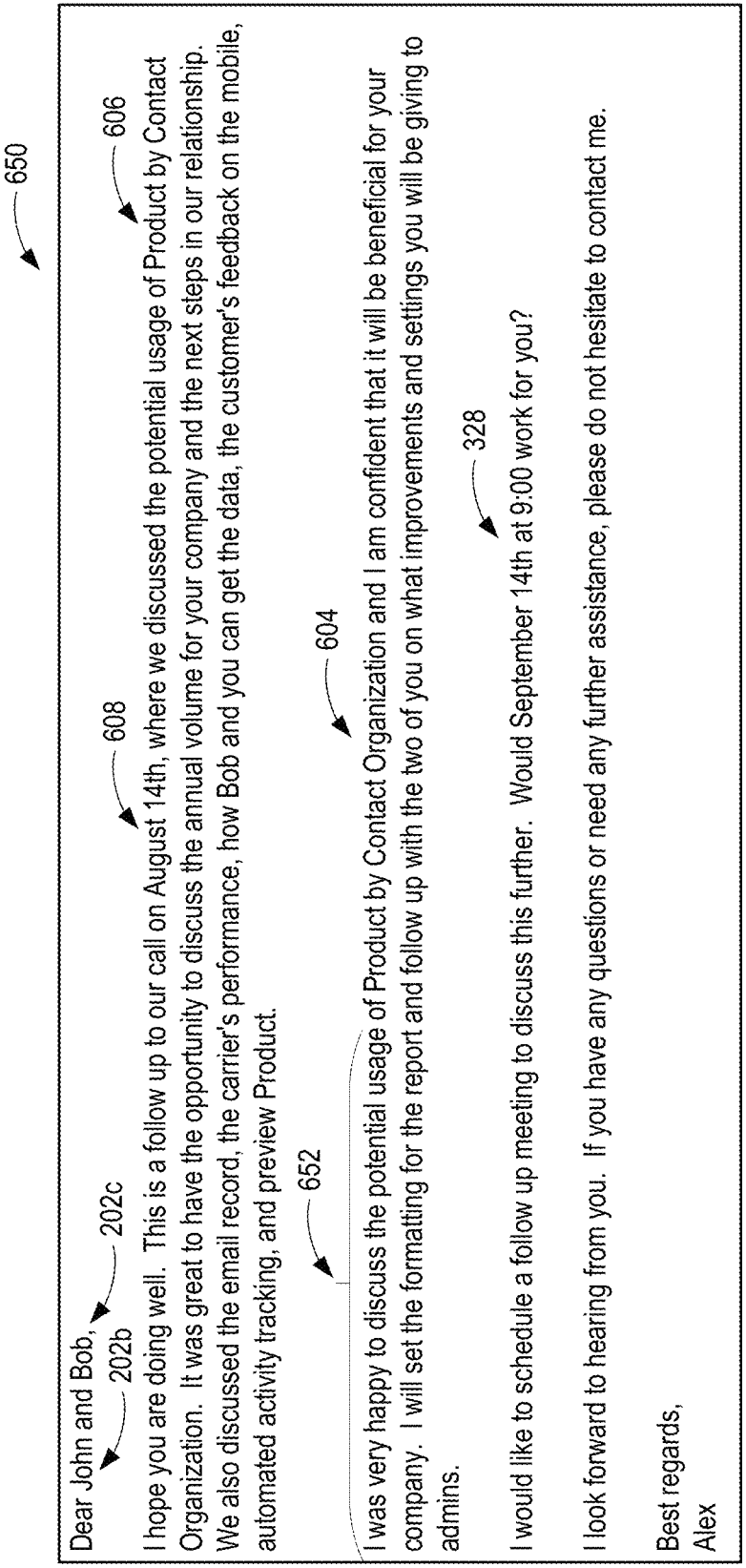

FIGS. 5A, 5B, and 5C illustrate an exemplary progression from input 120 through output text 130 for a two-participant conversation between speaker 106a as "Alex" and speaker 106b as "Sara". FIGS. 6A, 6B, and 6C illustrate another exemplary progression from input 120 through output text 130 for a three-participant conversation between speaker 106a as "Alex", speaker 106b as "John", and speaker 106c as "Bob".

FIG. 5A shows a textual passage 500, which may be a version of input 120. Name 202b, a contact sales stage 502 (from interaction history 324), an account name 504 (e.g., the contact's organization or employer), a product 506 that is the subject of the conversation, calendar information 328 (e.g., available appointment extracted from calendaring software), and a date 508 of the conversation are from topic-specific data 116. For example, name 202a, contact sales stage 502, account name 504, and product 506 are from CRM data 322, and calendar information 328 is from enterprise suite data 326. Date 508 may also be from enterprise suite data 326 or from another source, such as a timestamp of audio data 104.

Textual passage 500 also has a highlights section 510, which has name 202a included among several highlights, and an action items section 512 identifying multiple action items. Highlights section 510 and an action items section 512 are from summary 114. As can be seen in FIG. 5A, name 202a is "Sarah", while name 202b is "Sara".

FIG. 5B shows a textual passage 520, which may be a version of language model prompt 122. A call date field 522 shows date 508, a sender field 524 identified the email account and signature that should be used for email message 134. A recipient field 526 shows name 202b (rather than name 202a) and identifies the person (or other email account) to whom email message 134 is to be addressed. An account name field 528 identifies account name 504, and a product name field 530 identifies product 506. A meeting availability field 532 shows calendar information 328 as an available meeting time and date.

A highlights section 540 is a trimmed (curated) version of highlights section 510 of textual passage 500, and includes summary highlight 206. Action item 204 is also included, because it is a high-confidence action item. Another action item in action items section 512 of textual passage 500 was dropped, due to lower confidence or lesser relevance. A directives section 544 includes a set of language model directives to guide language model 124.

A directive 546 is a custom prompt for an early stage sales opportunity, because it will spur language model 124 to provide a proposition (i.e., an introduction) of a product for the recipient's organization (combining product 506 with account name 504). This is a result of contact sales stage 502 in textual passage 520. A directive 548 prompts language model 124 to suggest a follow-up meeting (or other call) based on calendar information 328.

FIG. 5C shows a textual passage 550, which may be a version of output text 130. Textual passage 550 includes name 202b, date 508, product 506, account name 504, and calendar information 328. A passage 552 is tailored for an initial contact sales stage, and may be based on how language model 124 reacts to directive 546.

FIG. 6A shows a textual passage 600, which may be a version of input 120. Name 202b, a contact sales stage 602, an account name 604 a product 606, calendar information 328, and a date 608 are from topic-specific data 116 and are equivalents of corresponding elements of FIG. 5A. Name 202c is also included, because textual passage 600 is for the scenario of a three-participant conversation. Textual passage 600 also has a highlights section 610 and an action items section 612 identifying multiple action items, and correspond to highlights section 510 and an action items section 512, respectively.

FIG. 6B shows a textual passage 620, which may be a version of language model prompt 122. A call date field 622 shows date 608, a sender field 624 identified the email account and signature that should be used for email message 134. A recipient field 626 shows name 202b and identifies the person (or other email account) to whom email message 134 is to be addressed. An account name field 628 identifies account name 604, and a product name field 630 identifies product 606. A meeting availability field 632 shows calendar information 328 as an available meeting time and date.

A highlights section 640 is a trimmed (curated) version of highlights section 610 of textual passage 600, and includes summary highlight 206. Action item 204 in an action items section 642 is also included, because it is a high-confidence action item. A directives section 644 includes a set of language model directives to guide language model 124.

A directive 646 is a custom prompt for a mid-stage stage sales opportunity, because it will spur language model 124 to provide language other than an introduction of a product. This is a result of contact sales stage 602 in textual passage 620. A directive 648 prompts language model 124 to suggest a follow-up meeting (or other call) based on calendar information 328.

FIG. 6C shows a textual passage 650, which may be a version of output text 130. Textual passage 650 includes names 202b and 202c, date 608, product 606, account name 604, and calendar information 328. A passage 652 is tailored for a mid-stage sales opportunity, and may be based on how language model 124 reacts to directive 646.

Figure 7:
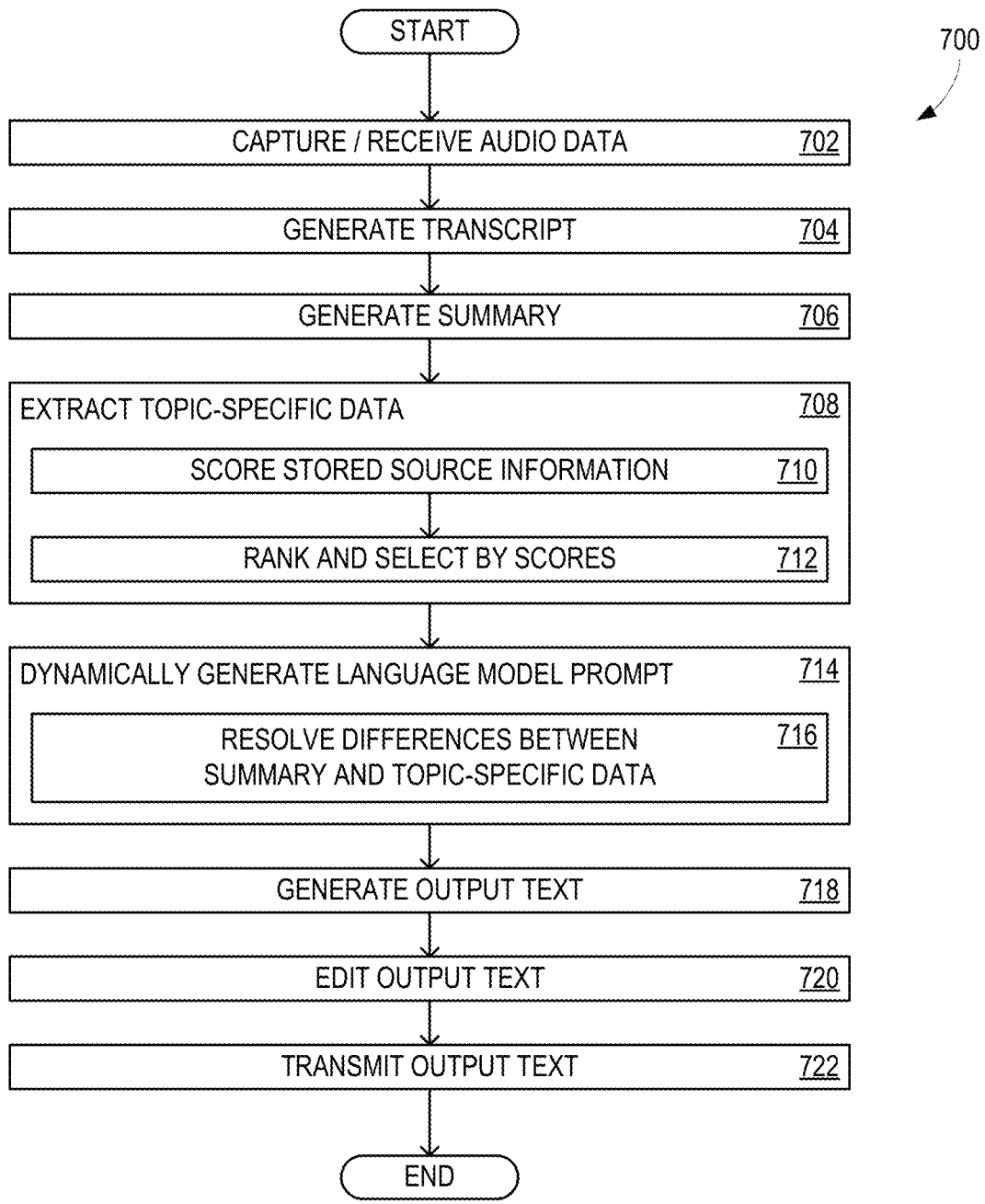
FIGS. 7 and 8 show flowcharts illustrating exemplary operations that may be performed when using example architectures, such as the architecture of FIG. 1.

FIG. 7 shows a flowchart 700 illustrating exemplary operations that may be performed by architecture 100 for dynamic construction of large language model prompts. In some examples, operations described for flowchart 700 are performed by computing device 900 of FIG. 9. Flowchart 700 commences with capturing or otherwise receiving audio data 104 in operation 702. Operation 704 generates transcript 112 using ASR on audio data 104. In the example shown in FIG. 1, audio data 104 contains voice signal 108 corresponding to name 202b in CRM data 322.

Operation 706 generates summary 114 of transcript 112 using summarization model 200. In some examples, summary 114 comprises action item 204 extracted from transcript 112. In some examples, summary 114 further comprises summary highlight 206. In some examples, summarization model 200 comprises an ATS model and/or an ML model.

Operation 708 extracts topic-specific data 116 from stored data 118 using scoring model 300. In some examples, stored data 118 comprises graph data. In some examples, stored data 118 comprises uncurated CRM data 302 and/or uncurated enterprise suite data 306. In some examples, topic-specific data 116 comprises curated CRM data 322 and/or curated enterprise suite data 326. CRM data 322 comprises name 202b. In some examples, enterprise suite data 326 comprises calendar information 328. In some examples, scoring model 300 comprises an ML model.

In some examples, operation 708 is performed using operations 710 and 712. Operation 710 scores stored data 118 for relevance to transcript 112 using scoring model 300. Operation 712 selects curated enterprise suite data 326 and curated CRM data 322 based on at least the scoring.

Operation 714 dynamically generates language model prompt 122 using topic-specific data 116 and summary 114. In some examples, language model prompt 122 is based on at least a count of speakers 106a-106c identified in summary 114. In some examples, language model prompt 122 is based on at least interaction history 324 associated with name 202a identified in summary 114. In some examples, language model prompt 122 is based on at least calendar information 328. In some examples, as part of operation 714, operation 716 resolves difference 402 between summary 114 and topic-specific data 116 in favor of topic-specific data 116. In some examples, difference 402 between summary 114 and topic-specific data 116 comprises a name difference.

Operation 718 generates output text 130 using language model 124 and language model prompt 122. In some examples, language model 124 comprises a GPT, such as GPT-3, GPT-4, or chatGPT. In some examples, output text 130 is edited in operation 720, prior to output text 130 being transmitted as email message 134. Operation 722 transmits output text 130 across computer network 140 as email message 134.

Figure 8:
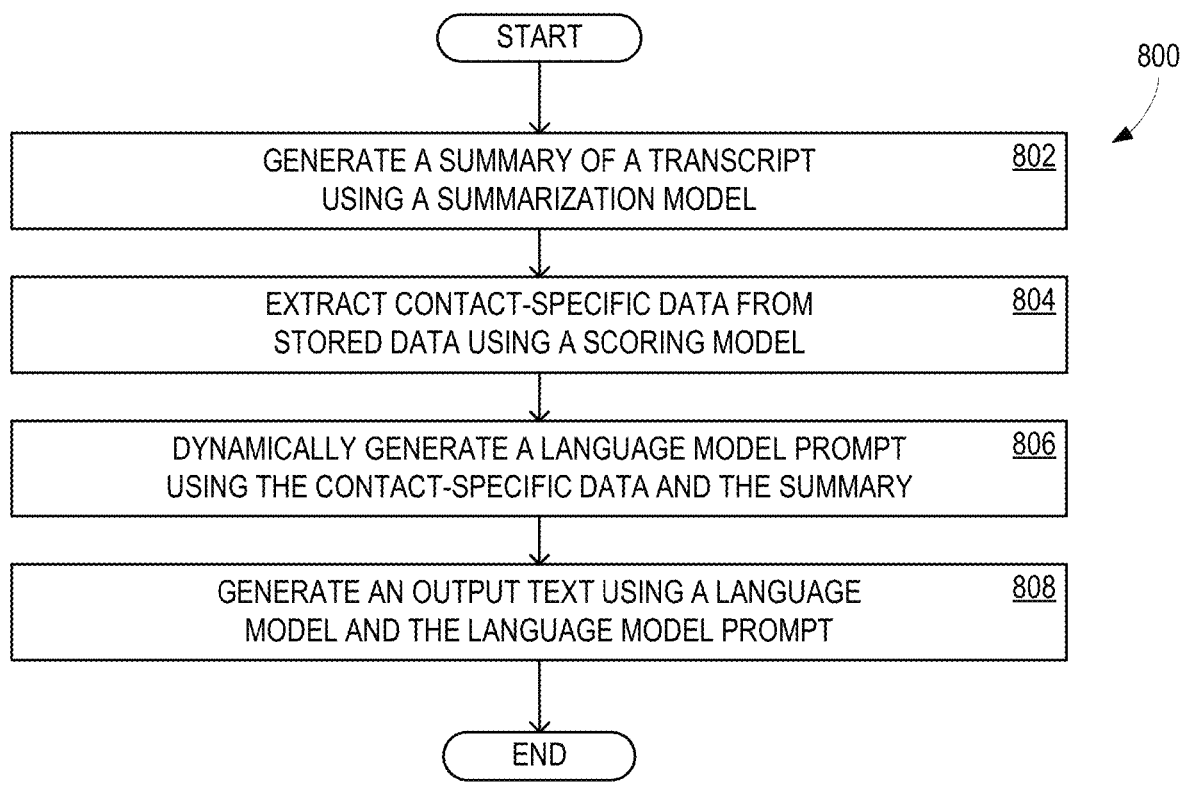

FIG. 8 shows a flowchart 800 illustrating exemplary operations that may be performed by architecture 100. In some examples, operations described for flowchart 800 are performed by computing device 900 of FIG. 9. Flowchart 800 commences with operation 802, which includes generating a summary of a transcript using a summarization model.

Operation 804 includes extracting topic-specific data from stored data using a scoring model. Operation 806 includes dynamically generating a language model prompt using the topic-specific data and the summary. Operation 808 includes generating an output text using a language model and the language model prompt.

Additional Examples

An example system comprises: a processor; and a computer-readable medium storing instructions that are operative upon execution by the processor to: generate a summary of a transcript using a summarization model; extract topic-specific data from stored data using a scoring model; dynamically generate a language model prompt using the topic-specific data and the summary; and generate an output text using a language model and the language model prompt.

An example computer-implemented method comprises: generating a summary of a transcript of audio data using a summarization model; extracting topic-specific data from stored data using a scoring model; dynamically generating a language model prompt using the topic-specific data and the summary; and generating an output text using a language model and the language model prompt.

One or more example computer storage devices have computer-executable instructions stored thereon, which, on execution by a computer, cause the computer to perform operations comprising: generating a summary of a transcript using a summarization model; extracting topic-specific data from stored data using a scoring model, wherein the stored data comprises graph data; dynamically generating a language model prompt using the topic-specific data and the summary; and generating an output text using a language model and the language model prompt.

Alternatively, or in addition to the other examples described herein, examples include any combination of the following:

- transmitting, across a computer network, the output text as an email message;
- the topic-specific data comprises curated enterprise suite data and curated CRM data;
- the summary comprises an action item extracted from the transcript;
- generating the transcript using ASR on audio data;
- the language model prompt is based on at least a count of speakers identified in the summary;
- the language model prompt is based on at least an interaction history associated with a name identified in the summary;
- the enterprise suite data comprises calendar information;
- the language model prompt is based on at least the calendar information;
- resolving a difference between the summary and the topic-specific data in favor of the topic-specific data;
- capturing the audio data;
- receiving the audio data;
- the audio data contains a voice signal corresponding to the name in the CRM data;
- the summary further comprises a summary highlight;
- the summarization model comprises an automatic text summarization (ATS) model;
- the summarization model comprises an ML model;
- the stored data comprises graph data;
- the stored data comprises uncurated enterprise suite data;
- the stored data comprises uncurated CRM data;
- the enterprise suite data comprises calendar information;
- scoring the stored data for relevance to the transcript using the scoring model;
- selecting the curated enterprise suite data and the curated CRM data based on at least the scoring;
- the CRM data comprises the name;
- the scoring model comprises an ML model;
- the difference between the summary and the topic-specific data comprises a name difference;
- the language model comprises a GPT;
- the language model comprises GPT-3, or GPT-4, or chatGPT; and
- prior to transmitting the output text as the email message, editing the output text.

While the aspects of the disclosure have been described in terms of various examples with their associated operations, a person skilled in the art would appreciate that a combination of operations from any number of different examples is also within scope of the aspects of the disclosure.

Example Operating Environment

Figure 9:
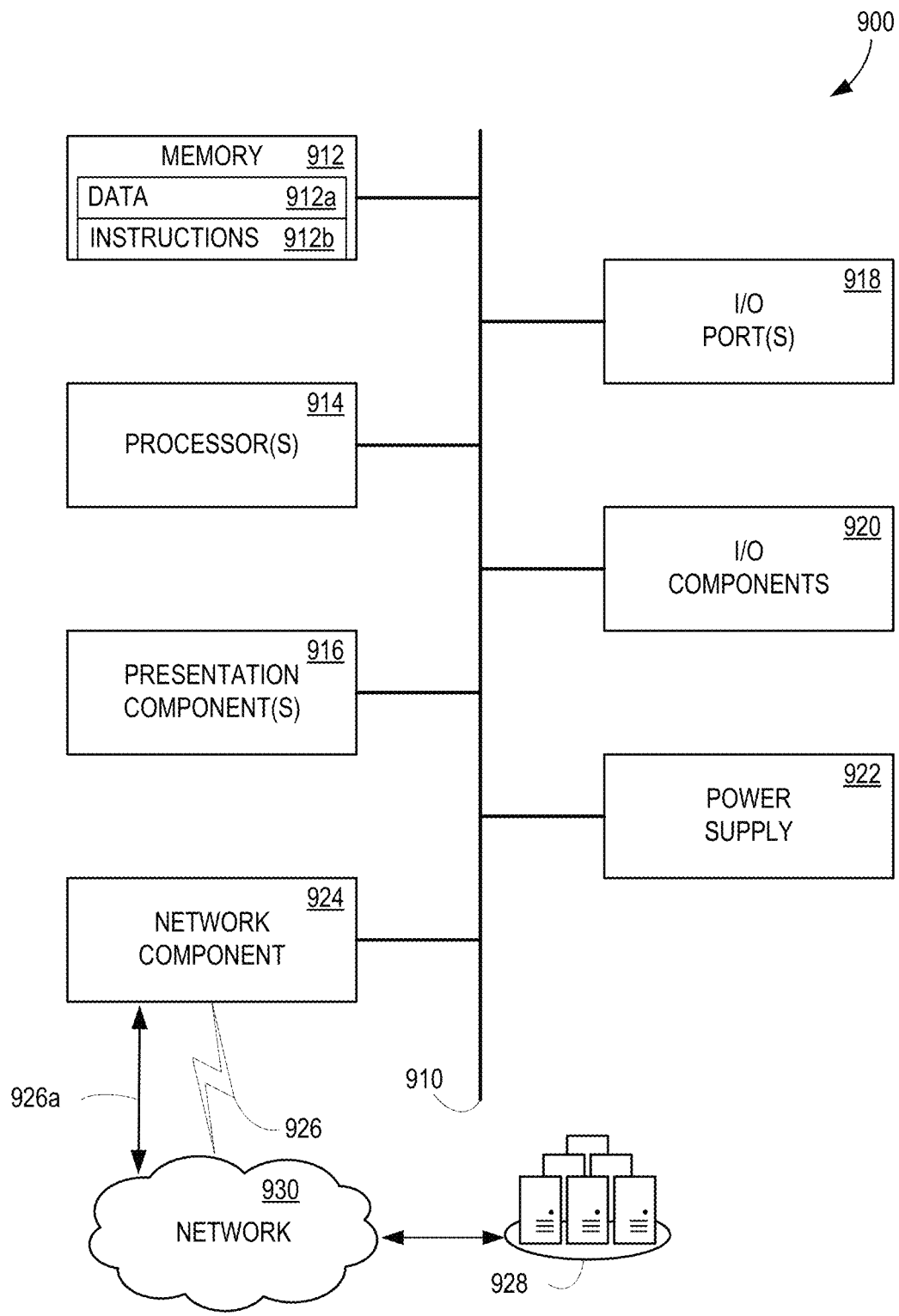
FIG. 9 shows a block diagram of an example computing device suitable for implementing some of the various examples disclosed herein.

FIG. 9 is a block diagram of an example computing device 900 (e.g., a computer storage device) for implementing aspects disclosed herein, and is designated generally as computing device 900. In some examples, one or more computing devices 900 are provided for an on-premises computing solution. In some examples, one or more computing devices 900 are provided as a cloud computing solution. In some examples, a combination of on-premises and cloud computing solutions are used. Computing device 900 is but one example of a suitable computing environment and is not intended to suggest any limitation as to the scope of use or functionality of the examples disclosed herein, whether used singly or as part of a larger set.

Neither should computing device 900 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 900 includes a bus 910 that directly or indirectly couples the following devices: computer storage memory 912, one or more processors 914, one or more presentation components 916, input/output (I/O) ports 918, I/O components 920, a power supply 922, and a network component 924. While computing device 900 is depicted as a seemingly single device, multiple computing devices 900 may work together and share the depicted device resources. For example, memory 912 may be distributed across multiple devices, and processor(s) 914 may be housed with different devices.

Bus 910 represents what may be one or more busses (such as an address bus, data bus, or a combination thereof). Although the various blocks of FIG. 9 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 9 and the references herein to a "computing device." Memory 912 may take the form of the computer storage media referenced below and operatively provide storage of computer-readable instructions, data structures, program modules and other data for the computing device 900. In some examples, memory 912 stores one or more of an operating system, a universal application platform, or other program modules and program data. Memory 912 is thus able to store and access data 912a and instructions 912b that are executable by processor 914 and configured to carry out the various operations disclosed herein.

In some examples, memory 912 includes computer storage media. Memory 912 may include any quantity of memory associated with or accessible by the computing device 900. Memory 912 may be internal to the computing device 900 (as shown in FIG. 9), external to the computing device 900 (not shown), or both (not shown). Additionally, or alternatively, the memory 912 may be distributed across multiple computing devices 900, for example, in a virtualized environment in which instruction processing is carried out on multiple computing devices 900. For the purposes of this disclosure, "computer storage media," "computer storage memory," "memory," and "memory devices" are synonymous terms for the memory 912, and none of these terms include carrier waves or propagating signaling.

Processor(s) 914 may include any quantity of processing units that read data from various entities, such as memory 912 or I/O components 920. Specifically, processor(s) 914 are programmed to execute computer-executable instructions for implementing aspects of the disclosure. The instructions may be performed by the processor, by multiple processors within the computing device 900, or by a processor external to the client computing device 900. In some examples, the processor(s) 914 are programmed to execute instructions such as those illustrated in the flow charts discussed below and depicted in the accompanying drawings. Moreover, in some examples, the processor(s) 914 represent an implementation of analog techniques to perform the operations described herein. For example, the operations may be performed by an analog client computing device 900 and/or a digital client computing device 900. Presentation component(s) 916 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 900, across a wired connection, or in other ways. I/O ports 918 allow computing device 900 to be logically coupled to other devices including I/O components 920, some of which may be built in. Example I/O components 920 include, for example but without limitation, a microphone, joystick, game pad, satellite dish, scanner, printer, wireless device, etc.

Computing device 900 may operate in a networked environment via the network component 924 using logical connections to one or more remote computers. In some examples, the network component 924 includes a network interface card and/or computer-executable instructions (e.g., a driver) for operating the network interface card. Communication between the computing device 900 and other devices may occur using any protocol or mechanism over any wired or wireless connection. In some examples, network component 924 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 924 communicates over wireless communication link 926 and/or a wired communication link 926a to a remote resource 928 (e.g., a cloud resource) across network 930. Various different examples of communication links 926 and 926a include a wireless connection, a wired connection, and/or a dedicated link, and in some examples, at least a portion is routed through the internet.

Although described in connection with an example computing device 900, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a processor; and
   a computer-readable medium storing instructions that are operative upon execution by the processor to:
   receiving a transcript of a conversation between participants;
   generate a summary of the transcript using a summarization model, the summary relating to a topic of the conversation;
   extract topic-specific data associated with the topic from a customer relations management (CRM) or enterprise suite data set using a scoring model, the CRM or enterprise data set excluding the transcript;
   dynamically generate a large language model (LLM) prompt based on the summary by resolving a difference between the topic-specific data and the summary in favor of the topic-specific data; and
   generate, by an LLM model, an output text based on the LLM prompt.

2. The system of claim 1, wherein the instructions are further operative to:
   transmit, across a computer network, the output text as an electronic mail (email) message.

3. The system of claim 1, wherein the topic of the conversation comprises an action item extracted from the transcript.

4. The system of claim 1, wherein the transcript is generated from audio data using automatic speech recognition (ASR).

5. The system of claim 1, wherein the LLM prompt is further generated based on a count of speakers identified in the summary.

6. The system of claim 1, wherein the topic-specific data comprises calendar information from the CRM or enterprise suite data set.

7. The system of claim 1, wherein the topic-specific data comprises a CRM interaction history of one of the participants.

8. A computer-implemented method comprising:
   receiving a transcript of a conversation between participants;
   generating a summary of the transcript of using a summarization model, the summary relating to a topic of the conversation;
   extracting topic-specific data associated with the topic of conversation from a customer relations management (CRM) or enterprise suite data set using a scoring model, the CRM or enterprise data set excluding the transcript;
   dynamically generating a large language model (LLM) prompt based on the summary by resolving a difference between the topic-specific data and the summary in favor of the topic-specific data; and generating, by an LLM model, an output text based on the LLM prompt.

9. The computer-implemented method of claim 8, further comprising:
transmitting, across a computer network, the output text as an electronic mail (email) message.

10. The computer-implemented method of claim 8, wherein the topic of the conversation comprises an action item extracted from the transcript.

11. The computer-implemented method of claim 8, wherein the transcript is generated from audio data using automatic speech recognition (ASR).

12. The computer-implemented method of claim 8, wherein the LLM prompt is further generated based on a count of speakers identified in the summary or an interaction history associated with a name identified in the summary.

13. The computer-implemented method of claim 8, wherein the topic-specific data comprises calendar information from the CRM or enterprise suite data set.

14. The computer-implemented method of claim 8, wherein the topic-specific data comprises a CRM interaction history of one of the participants.

15. A computer storage device having computer-executable instructions stored thereon, which, on execution by one or more processors of a system, cause the system to perform operations comprising:
receiving a transcript of a conversation between participants;
generating a summary of the transcript using a summarization model, the summary relating to a topic of the conversation;
extracting topic-specific data associated with the topic from a customer relations management (CRM) or enterprise suite data set using a scoring model, the CRM or enterprise data set excluding the transcript;
dynamically generating a large language model (LLM) prompt based on the summary by resolving a difference between the topic-specific data and the summary in favor of the topic-specific data; and
generating, via an LLM model, an output text based on the LLM prompt.

16. The computer storage device of claim 15, wherein the operations further comprise:
transmitting, across a computer network, the output text as an electronic mail (email) message.

17. The computer storage device of claim 15, wherein the topic of the conversation comprises an action item extracted from the transcript.

18. The computer storage device of claim 15, wherein the transcript is generated from audio data using automatic speech recognition (ASR).

19. The computer storage device of claim 15, wherein the LLM prompt is further generated based on a count of speakers identified in the summary or an interaction history associated with a name identified in the summary.

20. The computer storage device of claim 15, wherein the topic-specific data comprises a CRM interaction history of one of the participants.

* * * * *